United States Patent
Nossik et al.

(10) Patent No.: US 10,154,023 B1
(45) Date of Patent: Dec. 11, 2018

(54) METHOD AND SYSTEM FOR SECURE INSTANTIATION OF AN OPERATION SYSTEM WITHIN THE CLOUD

(71) Applicant: EMC CORPORATION, Hopkinton, MA (US)

(72) Inventors: Michael Nossik, Ottawa (CA); Timothy Roger Masson Bramble, Carp (CA); Murray McCulligh, Ottawa (CA); Yuri Berfeld, Ottawa (CA); Lejin Du, Kanata (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 147 days.

(21) Appl. No.: 14/972,377

(22) Filed: Dec. 17, 2015

Related U.S. Application Data

(60) Provisional application No. 62/093,899, filed on Dec. 18, 2014.

(51) Int. Cl.
| | |
|---|---|
| *H04L 29/06* | (2006.01) |
| *G06F 21/57* | (2013.01) |
| *G06F 9/4401* | (2018.01) |
| *G06F 21/53* | (2013.01) |
| *G06F 9/455* | (2018.01) |

(52) U.S. Cl.
CPC ........ *H04L 63/0823* (2013.01); *G06F 9/4406* (2013.01); *G06F 9/4416* (2013.01); *G06F 21/53* (2013.01); *G06F 21/575* (2013.01); *H04L 63/061* (2013.01); *G06F 2009/45575* (2013.01); *G06F 2009/45587* (2013.01)

(58) Field of Classification Search
None
See application file for complete search history.

(56) References Cited

U.S. PATENT DOCUMENTS

| | | | | |
|---|---|---|---|---|
| 8,745,365 | B2 * | 6/2014 | Jevans | G06F 9/4406 713/2 |
| 9,317,316 | B2 * | 4/2016 | Liu | G06F 9/45558 |
| 9,483,490 | B1 * | 11/2016 | Iyengar | G06F 17/30079 |
| 9,544,137 | B1 * | 1/2017 | Brandwine | H04L 9/083 |
| 10,013,561 | B2 * | 7/2018 | Ghafoor | G06F 21/575 |
| 10,064,240 | B2 * | 8/2018 | Stern | H04W 88/06 |
| 2006/0174109 | A1 * | 8/2006 | Flynn | G06F 9/4406 713/164 |
| 2007/0282757 | A1 * | 12/2007 | Pandya | G06F 21/31 705/76 |

(Continued)

OTHER PUBLICATIONS

Salah et al.; Analyzing the security of Windows 7 and Linux for cloud computing; 2012; Retrieved from the Internet <URL: http://www.sciencedirect.com/science/article/pii/S0167404812001800>; pp. 1-10, as printed.*

*Primary Examiner* — Saleh Najjar
*Assistant Examiner* — Michael W Chao
(74) *Attorney, Agent, or Firm* — Aventum IP Law LLP

(57) ABSTRACT

A method is disclosed for executing a secure virtual machine stored in encrypted form in IaaS cloud such as Microsoft Azure or Amazon Web Services. A first execution environment comprising a key access protocol for accessing a cipher key is initiated. The first execution environment executes the secure virtual machine by accessing a secret for use in deciphering the encrypted form of the secure virtual machine and providing same to allow the secure virtual machine to be executed.

14 Claims, 12 Drawing Sheets

(56) References Cited

U.S. PATENT DOCUMENTS

| | | | | |
|---|---|---|---|---|
| 2009/0089568 A1* | 4/2009 | Litwack | ............... | G06F 15/16 |
| | | | | 713/2 |
| 2009/0276617 A1* | 11/2009 | Grell | ............... | G06F 21/575 |
| | | | | 713/2 |
| 2011/0035574 A1* | 2/2011 | Jevans | ............... | G06F 9/4406 |
| | | | | 713/2 |
| 2011/0202765 A1* | 8/2011 | McGrane | ............... | G06F 21/53 |
| | | | | 713/168 |
| 2011/0214176 A1* | 9/2011 | Burch | ............... | G06F 9/455 |
| | | | | 726/15 |
| 2012/0030324 A1* | 2/2012 | Kohn | ............... | G06F 9/4416 |
| | | | | 709/222 |
| 2012/0151200 A1* | 6/2012 | Beachem | ............... | H04L 9/0894 |
| | | | | 713/2 |
| 2012/0179904 A1* | 7/2012 | Dunn | ............... | G06F 21/575 |
| | | | | 713/155 |
| 2012/0216052 A1* | 8/2012 | Dunn | ............... | G06F 21/78 |
| | | | | 713/193 |
| 2012/0254602 A1* | 10/2012 | Bhansali | ............... | G06F 21/575 |
| | | | | 713/2 |
| 2012/0265976 A1* | 10/2012 | Spiers | ............... | H04L 63/0218 |
| | | | | 713/2 |
| 2014/0122902 A1* | 5/2014 | Isozaki | ............... | G06F 12/1408 |
| | | | | 713/193 |
| 2014/0331089 A1* | 11/2014 | Mohindra | ............... | G06F 11/362 |
| | | | | 714/27 |
| 2016/0140343 A1* | 5/2016 | Novak | ............... | G06F 21/575 |
| | | | | 713/2 |
| 2016/0350535 A1* | 12/2016 | Garcia | ............... | G06F 21/572 |
| 2017/0061130 A1* | 3/2017 | Ghafoor | ............... | G06F 9/4406 |

\* cited by examiner

METHOD AND SYSTEM FOR SECURE INSTANTIATION OF AN OPERATION SYSTEM WITHIN THE CLOUD

FIELD OF THE INVENTION

The invention relates to software and more particularly to operating system security for cloud instantiation.

BACKGROUND

Some operating systems are designed for cloud implementations. Others are not. When an Operating System (OS) is designed for cloud-based operation, security for the cloud based operating system is quite complex. However, executing a secure operating system that is not intended for cloud based implementation within the cloud has some disastrous effects. Most secure operating systems require a user login to execute and the user login is required locally, on the local system. Clearly, having to connect to an OS console for attended boot is not desirable in cloud implementations as it requires manual operation by trusted personnel to provide a secret credential each time a virtual machine (VM) boots up. Alternatively, the operating system can be executed locally, in which case it is not cloud based. Finally, the operating system can be executed without security, in which case it is not a secure operating system. Another known solution is for the operating system to execute and then at some point after booting to request for authentication, which provides a lower and sometimes unacceptable standard of security.

Presently, there is a large IT push to cloud based infrastructure, but many of the applications that are in use require existing operating systems that do not support cloud based execution. There are known Windows® systems where the pre-boot environment can get an authentication code from another entity on a local area network. The known Windows® systems utilize optional DHCP parameters and therefore require network support for broadcast or multicast. The cloud environment does not allow systems to use either broadcast or multicast, which makes this solution unusable in a cloud environment. There are no known Linux® systems having an ability to get an authentication code from another entity on a local area network.

There is a need for another method of booting secure operating systems in the cloud that overcomes the issues caused by operating system security implementations.

SUMMARY

In accordance with an embodiment there is provided a method comprising: initiating a first execution environment, the first execution environment comprising a key access protocol for accessing a cipher key; and, initiating by the first execution environment a second virtual machine, the second virtual machine stored in encrypted form, the first execution environment accessing a cipher key for deciphering the encrypted form of the second virtual machine to allow it to be executed.

In accordance with an embodiment there is provided a method comprising: initiating a first execution environment within the cloud, the first execution environment comprising a key access protocol for accessing a cipher key and for storing said cipher key within the first execution environment and for executing an operating system stored in encrypted form; accessing by the first execution environment the cipher key for deciphering the encrypted form of the operating system to allow it to be executed within the first execution environment; and executing the operating system.

In accordance with an embodiment there is provided a method comprising: initiating a first execution environment, the first execution environment comprising a security protocol for verifying execution of the first execution environment is with acceptable security authentication and a key access protocol for accessing a cipher key and for storing said cipher key within the first execution environment and for executing an operating system stored in encrypted form; authenticating the first execution environment in execution to verify that execution of the first execution environment is with acceptable security authentication; accessing by the first execution environment the cipher key for deciphering the encrypted form of the operating system to allow it to be executed within the first execution environment; deciphering the encrypted form of the operating system to allow it to be executed within the first execution environment; and executing the unencrypted form of the operating system within the first execution environment.

In accordance with an embodiment, there is provided a method comprising: initiating a first execution environment, the first execution environment comprising an authentication protocol for determining that executing a second virtual machine is an immediate reboot thereof; and when it is determined that executing a second virtual machine is an immediate reboot thereof, initiating by the first execution environment the second virtual machine, the second virtual machine stored in encrypted form, the first execution environment providing a secret for deciphering the encrypted form of the second virtual machine to allow it to be executed.

In accordance with an embodiment, there is provided a method comprising: initiating a first execution environment, the first execution environment comprising a protocol for categorizing an execution thereof as one of automatic and user supported; when automatic, initiating by the first execution environment a second virtual machine, the second virtual machine stored in encrypted form, the first execution environment providing a secret for deciphering the encrypted form of the second virtual machine to allow it to be executed; and when user supported, initiating by the first execution environment a second virtual machine, the second virtual machine stored in encrypted form, the first execution environment requesting from a user a secret for being provided for deciphering the encrypted form of the second virtual machine to allow it to be executed.

In accordance with an embodiment, there is provided a method comprising: providing a key server in execution within an execution environment; receiving at the key server a request for authentication of a secret, the request comprising a token; analyzing the token to determine a validity thereof and when valid, providing from the secret database an indication of authentication.

In accordance with an embodiment, there is provided a method comprising: providing a key server in execution within an execution environment; receiving at the key server a request for a secret; authenticating the request through an interface with a human operator; when authenticated, providing from the key server a time expiring token related to the authentication and for storage; and when authenticated, providing from the key server a secret.

In accordance with an embodiment, there is provided a method comprising: initiating a first execution environment, the first execution environment comprising a protocol for categorizing an execution thereof as one of automatic and user supported; when automatic, initiating by the first execution environment a key server, the key server stored in encrypted form, the first execution environment providing a secret for deciphering the encrypted form of the key server to allow it to be executed; and when user supported, initiating by the first execution environment a key server, the key server stored in encrypted form, the first execution environment requesting from one of a user and another key server a secret for being provided for deciphering the encrypted form of the key server to allow it to be executed.

BRIEF DESCRIPTION OF THE DRAWINGS

The instant invention will now be described by way of example only, and with reference to the attached drawings, wherein similar reference numerals denote similar elements throughout the several views, and in which.

DETAILED DESCRIPTION OF THE DRAWINGS

Figure 1:
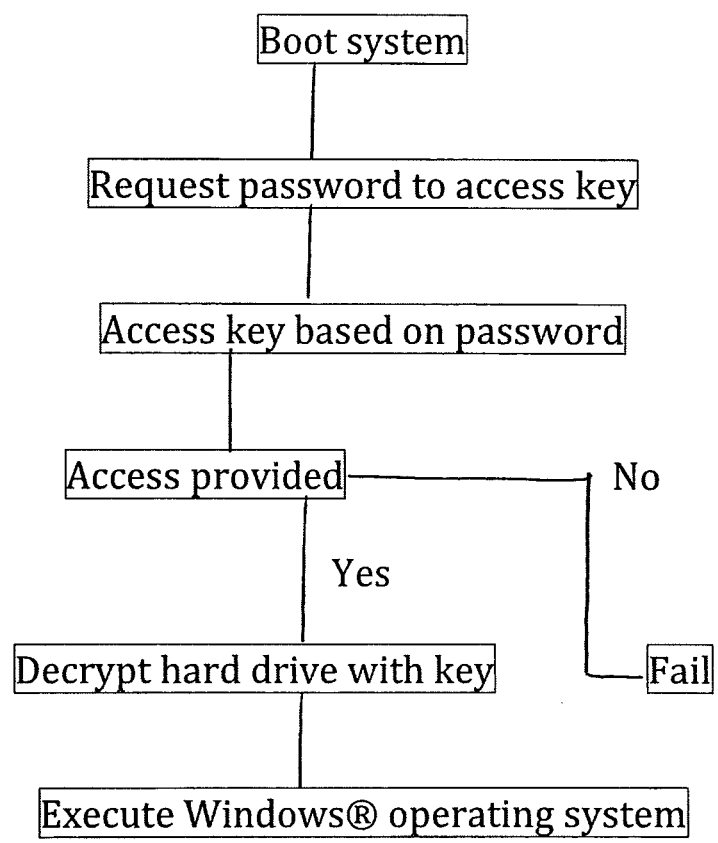
FIG. 1 is a simplified flow diagram of a prior art method of executing Windows® operating system locally in a secure fashion.

Referring to FIG. 1, shown is a simplified flow diagram of a prior art method of executing Windows® in a secure fashion on a local system. The Windows® implementation has secured the contents of the local hard drive using encryption technology. During the boot process, authentication data in the form of a secret is requested prior to execution of the operating system in order to be provided access to the unencrypted operating system data stored in encrypted form within the hard drive. Absent the secret, Windows® cannot execute as the Windows® operating system data cannot be deciphered.

Once the secret is provided, the ciphered data is decrypted and Windows® operating system executes in its usual fashion. The operating system implements its own security in execution and accesses secured data within the storage media via the cipher key accessed or determined in part based on the provided secret. In Windows®, the secret must be provided directly on the local system. An example of a secret is a password.

Figure 2:
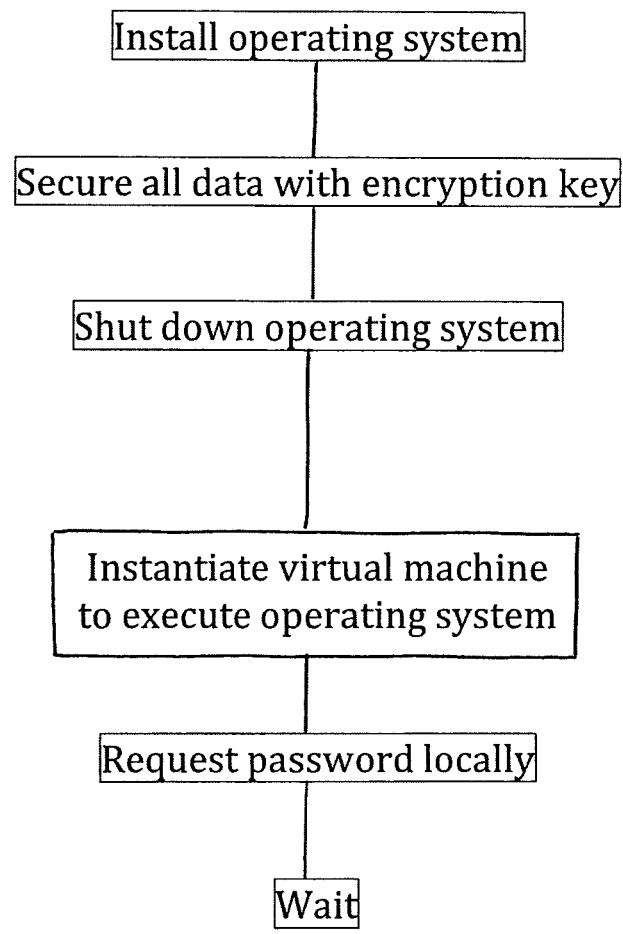
FIG. 2 is a simplified flow diagram of a method of executing the Windows® operating system of FIG. 1 within the cloud.

Referring to FIG. 2, shown is the same Windows® operating system of FIG. 1 installed on a server within the cloud. The system operates perfectly, securing data and accessing secured data within its cloud installation. When shut down, the data within the cloud storage media are stored, when necessary, encrypted and inaccessible without a cipher key accessible via a password. When a virtual machine—an instantiation of a cloud server—is executed, it immediately prompts the local keyboard and display for a secret in the form of a password and is in a locked state from that point forward as no local password is provided and no local individual has the password. Of note, the secret is necessary to unwrap a cryptographic key to provide access to the encrypted operating system data. Of course other methods of providing the secret such as from a local storage device, a floppy, or using trusted platform module (TPM) are also known for locally executed operating systems. Essentially, cloud implementations can live anywhere and it would be onerous to place an individual in every possible execution location for a cloud-based implementation. Thus, a different secure operating system is required for cloud based installations and the Windows® operating system shown must be installed locally—is only suited to non-cloud based installations. Unfortunately, neither a local storage device nor a trusted platform module (TPM) are available for cloud instantiations of the operating system.

Another problem with the prior art method for booting an encrypted operating system is that it relies on BIOS commands to function, yet the same BIOS commands may not be accessible within a cloud virtual machine. Whereas the BIOS of a given hardware installation is known and configurable, the BIOS hardware emulated in software by a cloud platform is less predictable. A problem with BIOS is that adding software to it is difficult due to limited address space. UEFI makes this easier, but problematically, UEFI is not available on cloud platforms as of yet.

Figure 3:
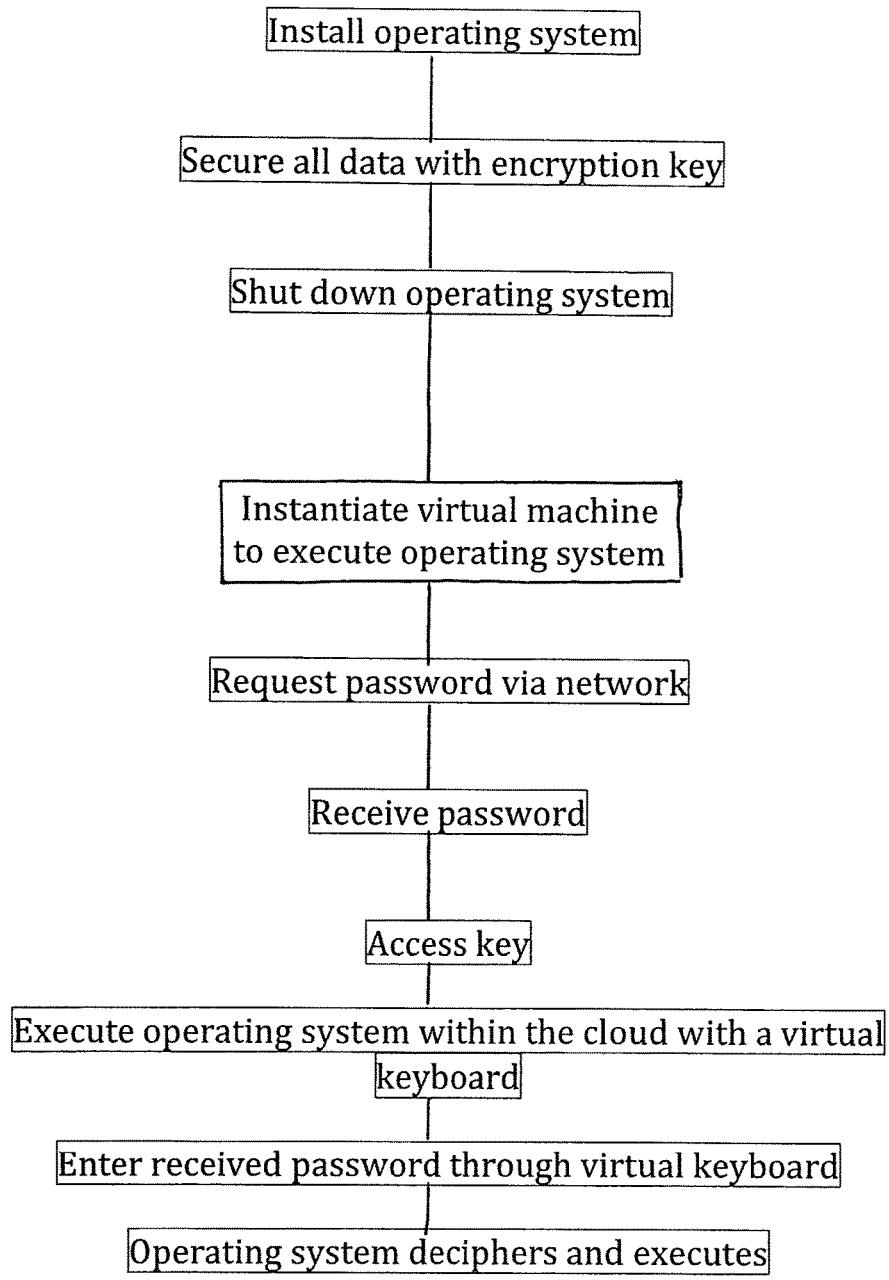
FIG. 3 is a simplified flow diagram of a method of executing the Windows® operating system within the cloud while maintaining security therefore, according to an embodiment.

Referring to FIG. 3, shown is an embodiment for installing the Windows® secure operating system within the cloud. Alternatively, the embodiment is implemented with other operating systems and/or encrypted virtual machines. Here, a first execution environment in the form of a wrapper operating system, a pre-boot environment, is created for executing the Windows® operating system therefrom. The wrapper operating system requests a secret via a cloud interface and stores the secret locally for delivery via a virtual interface to the cloud based Windows® installation. Alternatively, another supported virtual interface may be used. The Windows® installation is optionally configured to execute within a small wrapper allowing keyboard stroke entry via the virtual interface for secret reception and entry. The wrapper is optionally secured to prevent execution of the operating system absent a correct wrapper access code and to secure the access code between when it is received and when it is used. Such a security measure may prevent unauthorized bots from attacking the operating system and/or the wrapper with a brute force attack within the cloud.

Figure 4:
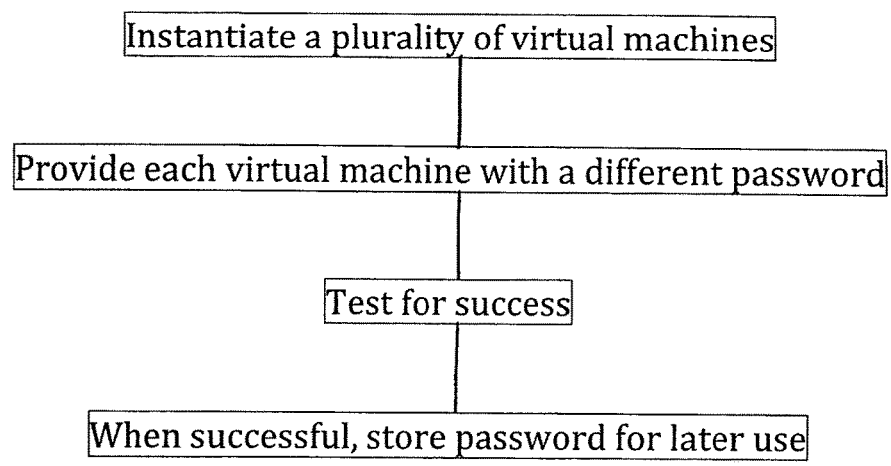
FIG. 4 is a simplified flow diagram for a prior art brute force attack on an operating system installed for execution within the cloud.

Referring to FIG. 4, shown is a simplified flow diagram for a prior art brute force attack on an operating system installed for execution within the cloud. A plurality of virtual machines is instantiated within the cloud and each executes a virtual machine in parallel or approximately in parallel. Then to each instantiation is provided a different access code or password, a guess, in order to determine a correct access code. Eventually, when the correct access code is "guessed," the virtual machine is accessed. Thus, unlike serial attempts to guess an access code, many access code guesses are supported in parallel in such an attack.

Figure 5:
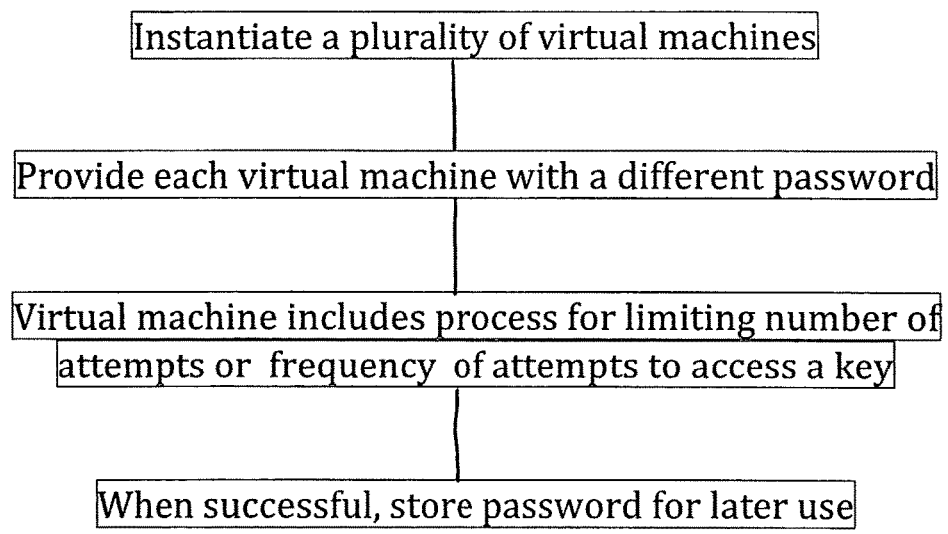
FIG. 5 is a simplified flow diagram of another embodiment of a method of instantiating Windows® operating system securely within the cloud wherein the wrapper is itself protected via security protocols.

Referring to FIG. 5, shown is another embodiment wherein a first execution environment in the form of a wrapper is itself protected via security protocols. The security within the wrapper application is optionally configured in any of a number of ways. For example, the wrapper may access an external key server to retrieve secret information for accessing a ciphered operating system allowing for a single central control to shut down wrapper instantiation, thereby preventing a brute force attack. Such a secret may be arbitrarily long making a brute force attack somewhat unfeasible. The wrapper may be configured with a limited number of executions—a lifespan—encoded therein. Further, executing the operating system by the wrapper may involve some human involvement such as a Captcha or another query response security feature. Thus, the wrapper application is optionally secured against attack separately from and/or in conjunction with the operating system.

Figure 6:
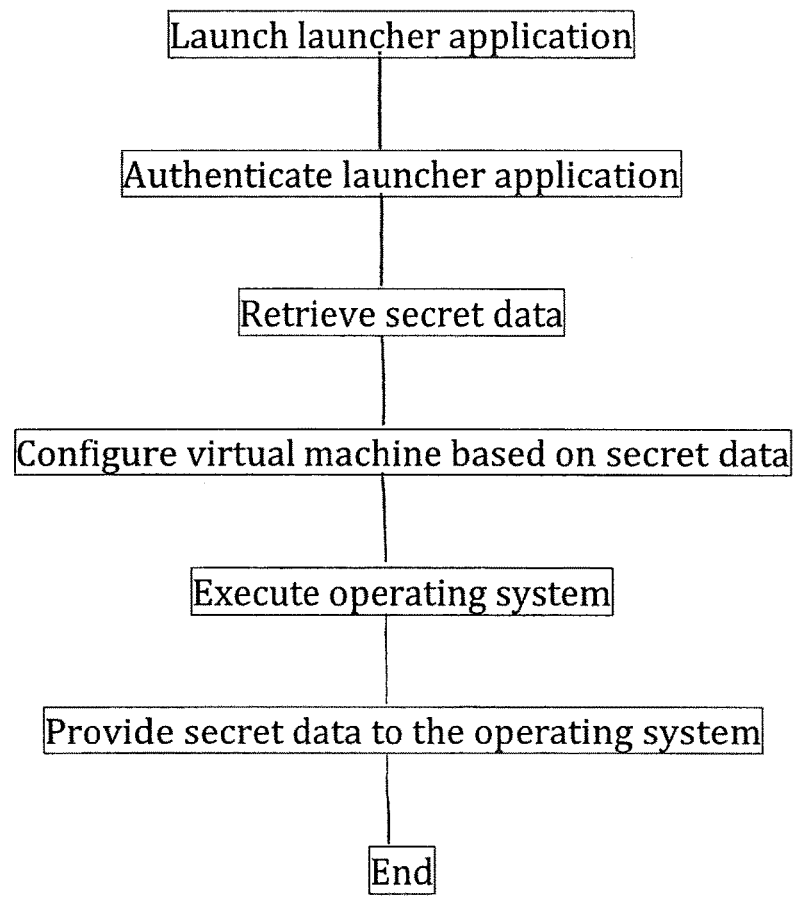
FIG. 6 is a simplified flow diagram of a method of implementing a secure operating system launcher for cloud installation of secure operating systems intended for local execution.

The pre-boot environment may request a security code for executing the operating system. The operating system may be set up with an arbitrarily complex security code that is secured and stored within the launcher, the pre-boot environment. Authenticating to the launcher, acceptable security, may result in gaining access to the security data. Alternatively, the launcher is provided with access to a key server wherein the security data is stored and retrieves the security data only once authentication is completed of both the launcher and an individual executing the launcher. The launcher application itself may be configured and sized to execute within a same virtual machine as the operating system. In an embodiment described with reference to FIG. 6, the launcher application is launched. It is then authenticated for execution. It then retrieves secret data from either a secure store or from the user and configures the Virtual Machine, executes the operating system, provides the secret data to the operating system and is finished its task. At this point it may go dormant, may be overwritten, or may stop execution. Alternatively, it may continue execution.

Figure 7:
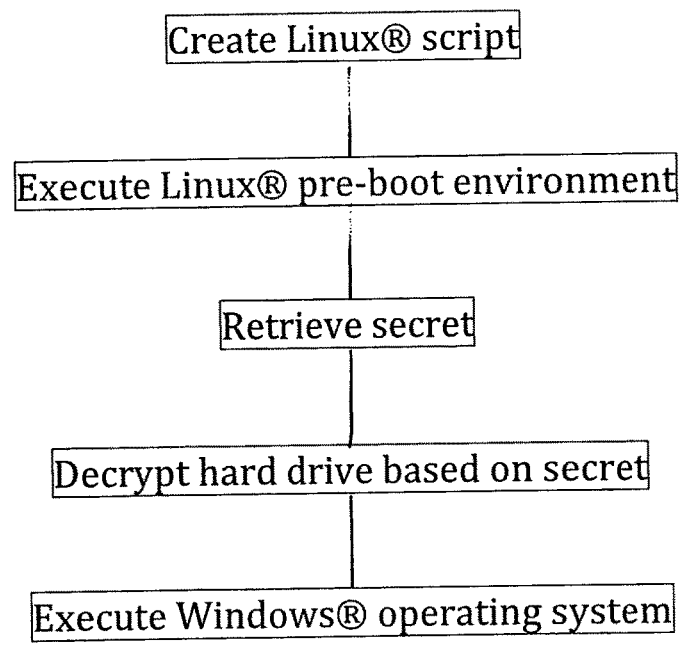
FIG. 7 is a simplified flow diagram of a method of implementing a secure operating system launcher with Linux®.

Referring to FIG. 7, shown is a simplified flow diagram of an embodiment wherein a first execution environment in the form of a pre-boot environment is a Linux® environment. A script is created for execution within the virtual machine to set up the secret data within the virtual machine and execute the Windows® operating system once the virtual machine is so configured. Since Linux® does not require the space of a complete graphical user interface based operating system, it can be used in very limited and efficient space allowing the operating system to boot from within the Linux environment. Thus, using Linux®, one can create a launcher application that meets the criteria set out above for launching a secure operating system in the form of a secure Windows® operating system instantiation in the cloud.

Figure 8:
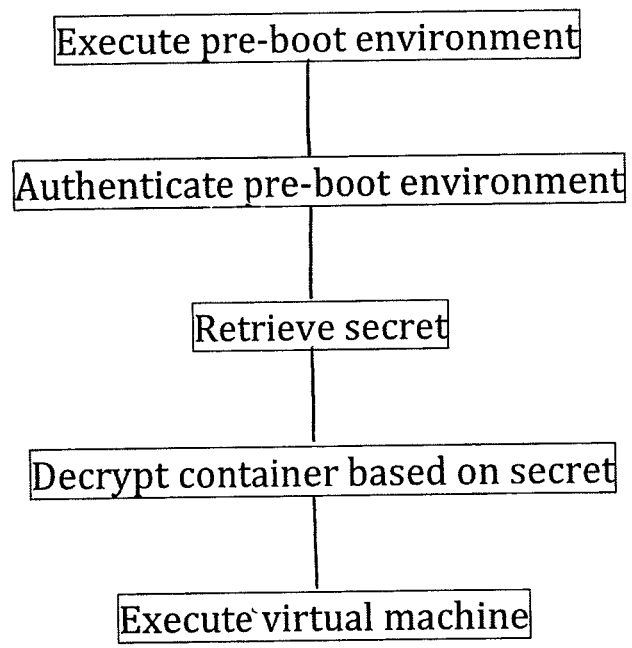
FIG. 8 is a simplified flow diagram of a method of implementing a secure container launcher for cloud installation.

Though the above noted embodiments are described with reference to the Windows® operating systems, they may also be applicable in whole or in part to use with other operating systems and virtual machines. For example, the use of a first operating system to execute a secure operating system that is stored in encrypted form may allow for restoring of suspended virtual machines that are secured with encryption. Referring to FIG. 8, shown is a simplified flow diagram of an embodiment wherein a first operating system, wrapper, is used for executing a secured container. The wrapper is executed. Security protocols within the wrapper authenticate the wrapper and may also authenticate a user or executer of the wrapper. The wrapper, once authenticated, retrieves a secret for use in executing the secured container. The secured container is then executed and the secret provided for deciphering of the container or portions thereof. Once executed, the virtual machine of the container is instantiated. Thus, a virtual machine may be stored securely within a container, for example encrypted.

Figure 9:
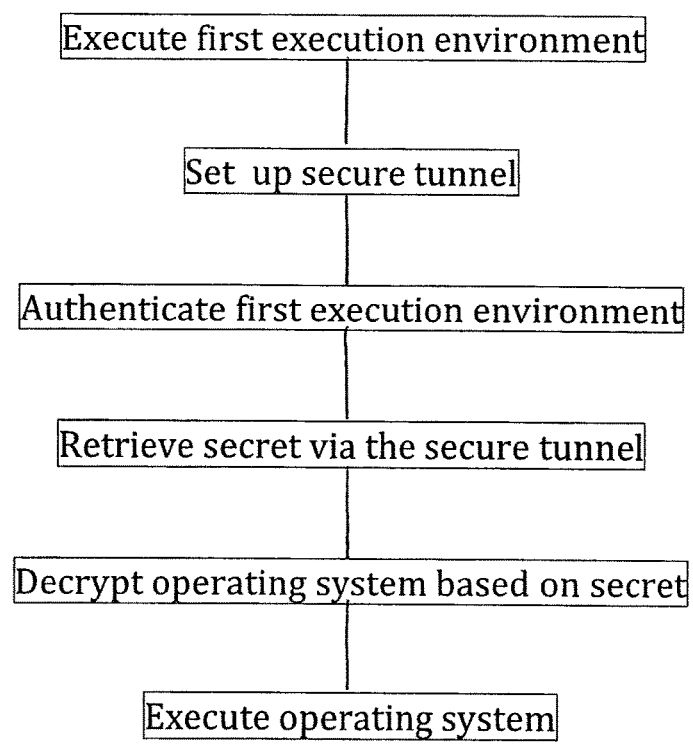
FIG. 9 is a simplified flow diagram of a method of implementing a secure launcher for cloud installation relying on a secure tunnel for authentication operations.

Referring to FIG. 9, shown is a simplified flow diagram of an embodiment relying on a secure tunnel for sharing a secret to instantiate a secure operating system. A first execution environment in the form of a pre-boot environment sets up a secure tunnel with a destination for receiving a secret therethrough. As such, only those systems supporting the secure tunnel and with which a secure tunnel is supported are able to instantiate the secure operating system. For example, a secure tunnel may be uniquely limited to being formed with a specific known physical destination in the form of a client location or, alternatively, a logical destination in the form of an IP address. Thus, only those physically at the client location—individuals or systems—provide the secret. Once the secret is received, the pre-boot environment is instantiated the operating system using the secret key. Alternatively, another virtual machine may be instantiated. Similarly, a secure tunnel to an enterprise key server may restrict instantiation operations to those—either individuals or systems—with authorization on the enterprise key server.

In some embodiments, a secure pre-boot environment may authenticate to an authentication service outside the cloud. For example, authentication may be to a human user via a communication channel in order to receive the secret information that secures the boot environment and to thereby maintain security of the boot environment. Optionally, one or more security protocols may be available to the pre-boot environment including IP address of the authenticator outside the cloud, GUID, a checksum of the boot-environment to ensure that tampering has not occurred, a one-time password generator, a challenge response system, and so forth. Further, security of the communication channel to the authenticator may be also in accordance with any of a plurality of known or secret protocols.

Figure 10:
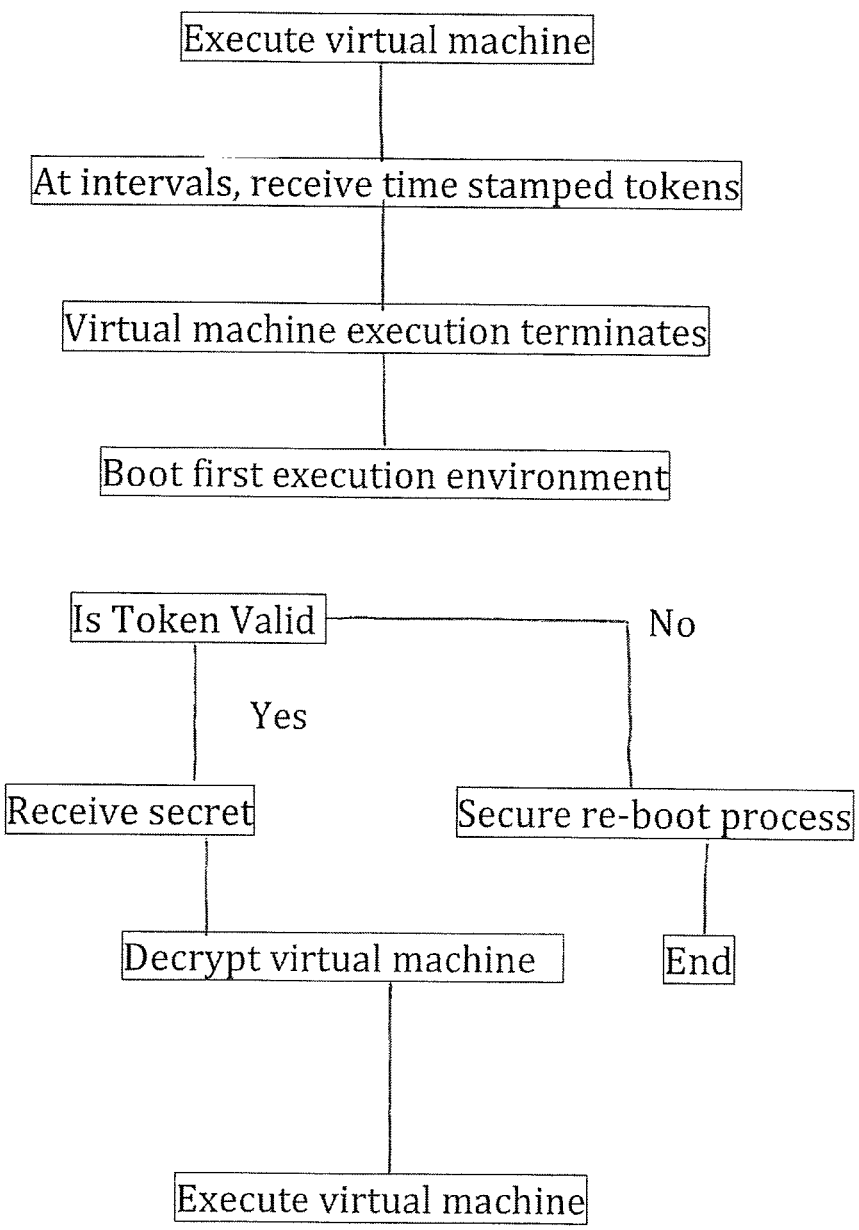
FIG. 10 is a simplified flow diagram of a method of supporting unattended re-boot of a cloud instantiated secure environment.

With reference to FIG. 10, shown is a simplified flow diagram of another method for supporting automatic authentication. A rotating token is generated for use in authentication. A virtual machine and authentication service transmit a random value, the token, encoded with expiration time T to a first virtual machine. At intervals, a new token is generated and sent to the first virtual machine. The token is stored within a token store. Preferably, the intervals minimize any time that the first virtual machine is without a valid token. Upon reboot, a first execution environment in the form of a pre-boot environment provides the token it finds within its token store to an authentication service. When the token is valid—both in content and expiration time, the re-boot operation is permitted without further authentication and the secret is released from the authentication service to the first execution environment for re-booting of the first virtual machine. When the token is no longer valid, an alarm is raised indicating that the first virtual machine was down for a time greater than a supported re-boot period and may have been stolen. Of course, a power outage lasting longer than T and resulting in a re-boot of the first virtual machine also results in such an alarm. A different alarm may be raised when the token content is invalid separate from the expiration time. Alternatively, further authentication of the first execution environment is performed.

When the authentication service providing the secrets to encrypted virtual machines is also a virtual machine in execution in a cloud, it may be subject to arbitrary shut-downs and re-boots. While the authentication service of FIG. 10 is shut down the virtual machines relying thereon cannot boot or re-boot. Moreover, the authentication service likely relies on attended boot, because it needs a secret to start, just like other secure virtual machines. Thus, the attended boot of the authentication service may delay and may affect secure virtual machine execution. As a first solution, redundant authentication service virtual machines are executed allowing for failure or shut down of one while retaining operability of others. That said, because of the attended boot problem, this is both onerous to start up and may fail to solve the problem when attendants are slow to reboot virtual machines.

Figure 11:
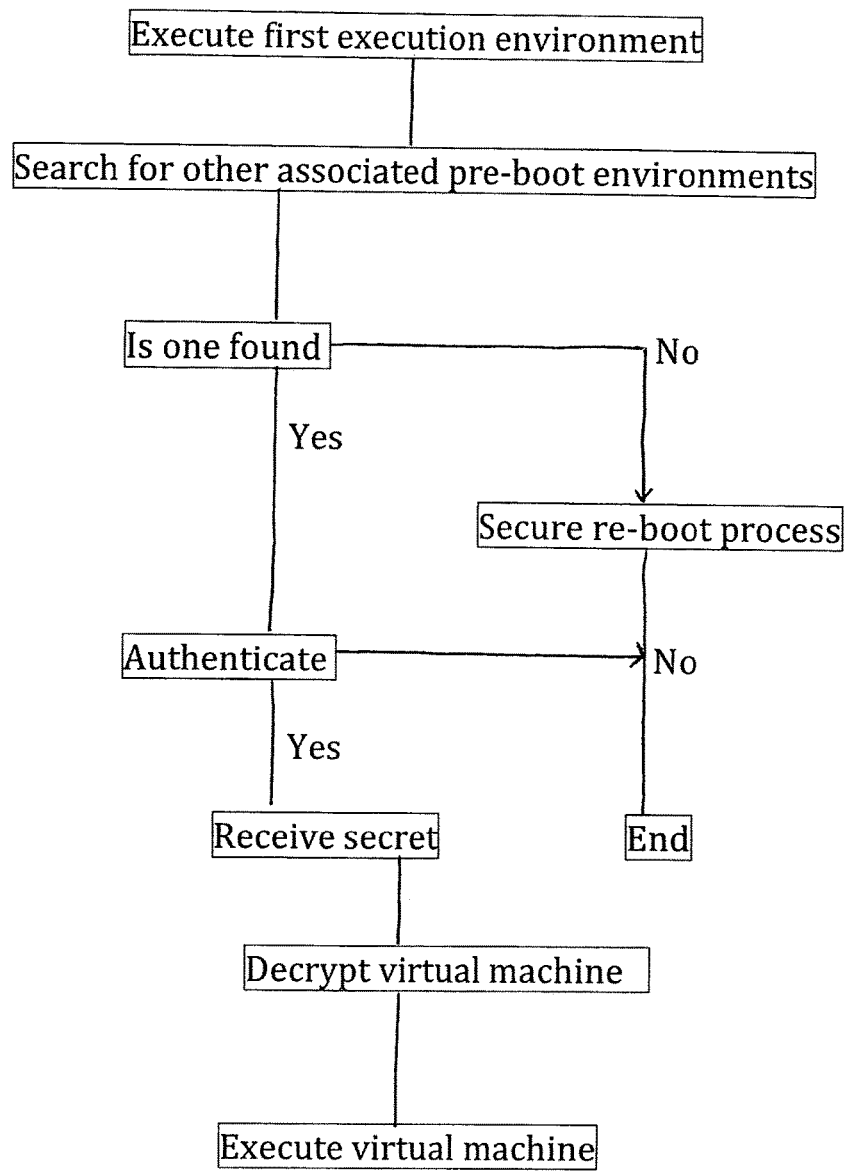
FIG. 11 is a simplified flow diagram of a method of implementing a secure operating system launcher for cloud instantiation of a virtual machine where each instantiation operates as both a client and authentication server.

Referring to FIG. 11, shown is another embodiment of a method of instantiating cloud based virtual machines executing secure operating systems as described hereinabove. In the flow diagram of FIG. 11, a first execution environment in the form of a pre-boot environment having a virtual system associated therewith and for execution thereby is executed. The pre-boot environment searches for other copies of an associated virtual system within the cloud. When another version of the same virtual system is found—a duplicate service—the pre-boot environment retrieves authorization data—a secret—therefrom for instantiating the operating system within the virtual machine. Typically, the found virtual machine or another service authenticates the pre-boot environment, establishes acceptable security authentication, prior to release of the secret. For example, a plurality of services each communicates with the pre-boot environment and an approximate location thereof is determined. When the approximate location is consistent with a previous location for execution of the virtual system and the pre-boot environment is identified as associated with said location, then the secret is released. When it is determined that the pre-boot environment is in a different location from where the virtual system associated therewith is intended to execute, the secret is other than released and the virtual system is other than executable. This process allows for automated re-boot of secure virtual systems so long as they and/or the network surrounding them remains substantially unchanged. Changes in location are determinable based on several different factors such as addressing, timing, and so forth. By relying on several services, different timing is measurable supporting more accurate location services. That said, location approximation is also possible with a single service. Of course, other methods of verifying location are employable.

For example, duplicate service providers are instantiated and eliminated as needed in a non-automated fashion while re-booting of instantiated service providers is automated and unattended. Alternatively, when no instantiation of the virtual system is found, then another method for authentication is used. Thus, the first instantiation of a service requires authentication data provided from a user or another source to ensure acceptable security authentication, whereas restarting or resetting instantiations is more automated as acceptable security authentication results from other systems in execution or via a token related approach. This is particularly useful in practical installations of a cloud service. Alternatively, a first instantiation is not cloud based, but instead executes in a known secure location.

In some embodiments, the virtual machines need not be exact duplicates and may be related one to another in a known fashion. The virtual machines may not be for providing a same service. For example, the virtual machines may be for providing co-operative services or related services. Alternatively, the virtual machines may be for providing unrelated services from a same service provider. Such an embodiment may also allow for servicing of physical machines on which virtual machines are hosted by instantiating a new instance of the virtual machine and then taking down the existing instance to service the physical machine on which the virtual machine was executing. Once serviced, the original machine may be restarted and the instance may be re-instantiated on that machine and all this may be done without requiring authentication data to be manually provided.

Figure 12:
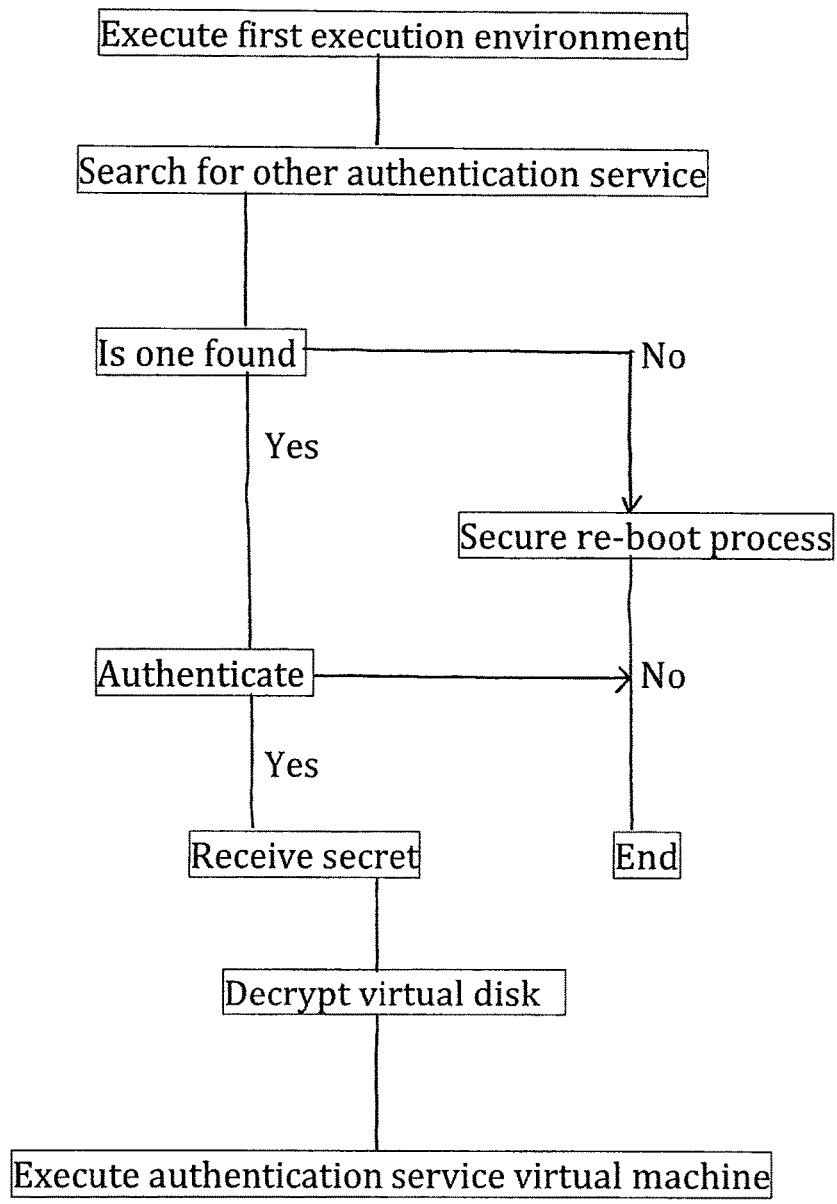
FIG. 12 is a simplified flow diagram of a method of implementing a virtual authentication server group where authentication servers operate as both a client and authentication server for the other authentication servers.

In some embodiments, the authentication server is a redundant service virtual machine supporting automated execution as shown in FIG. 12. As long as an authentication service remains in execution, each further authentication service is capable of secure unattended re-boot. For example, a number of authentication services supported is predetermined such that a certain number of services may boot unattended once the first service is booted. Alternatively, each authentication service process is booted initially and only reboot is supported in an unattended fashion. When a time expiring token is used, the reboot may be limited to a predetermined time frame. When other methods are employed by the authentication service, other limitations on the rebooting of authentication services may exist. Each authentication service may have an encrypted disk(s) or an encrypted virtual disk, and at least one other redundant authentication service virtual machine authenticates a rebooting authentication service and provides thereto a secret, once authenticated.

In some embodiments, the second virtual machine is executed within the first execution environment.

In some embodiments, the second virtual machine is executed by the first execution environment thereby replacing the first execution environment within a same virtual memory space.

In some embodiments a Linux® operating system stores the cipher key within a known memory location prior to initiating a Windows® operating system, the Linux® operating system controlling at least an aspect of the Windows® operating system one of before and during execution thereof to enter an unsecured password to the Windows® operating system to support decryption of the Windows® operating system and execution thereof within the first execution environment.

Numerous other embodiments may be envisaged without departing from the scope of the invention.

What is claimed is:
1. A method comprising:
    initiating a first execution environment, the first execution environment comprising a key access protocol for accessing a cipher key; and,
    initiating by the first execution environment a virtual machine, the virtual machine stored in encrypted form, the first execution environment accessing the cipher key for deciphering the encrypted form of the virtual machine to allow the virtual machine to be executed, wherein the first execution environment comprises a pre-boot environment comprising a Unix-like virtual machine and wherein the virtual machine comprises an operating system including encryption of portions of the operating system required for execution of the operating system other than a preboot portion thereof within the operating system and requiring password entry prior to decryption of the encrypted portions of the operating system, and wherein the first execution environment controls at least an aspect of the operating system during execution thereof to enter an unsecured password through a keyboard interface to the operating system to continue execution of the virtual machine.

2. A method according to claim 1 comprising:
storing by the first execution environment the cipher key within a known memory location prior to initiating the virtual machine.

3. A method according to claim 1 wherein the key protocol comprises providing a token stored within the first execution environment and having an expiry time to a third other virtual machine for authentication and the first virtual environment for, when authenticated, receiving a secret at the first execution environment in response to the authentication.

4. A method according to claim 1 wherein the first execution environment comprises an interface interfacing with a secure key store for retrieving therefrom the cipher key, the interface for performing an integrity check on at least one of the first execution environment and the virtual machine.

5. A method according to claim 1 wherein the first execution environment comprises an interface for interfacing with a user, the interface for demanding user reply.

6. A method according to claim 1 wherein the virtual machine is executed within the first execution environment.

7. A method according to claim 1 wherein the first execution environment is in execution within a first virtual memory space, and wherein the virtual machine is executed by the first execution environment thereby replacing the first execution environment within the first virtual memory space.

8. A method comprising:
initiating a first execution environment, the first execution environment comprising a key access protocol for accessing a cipher key; and,
initiating by the first execution environment a virtual machine, the virtual machine stored partially in encrypted form and requiring a secret for decrypting thereof, the first execution environment accessing the secret for deciphering the encrypted form of the virtual machine to allow the virtual machine to continue execution,
wherein the first execution environment comprises a security protocol for verifying an initiator thereof to authenticate the initiator as someone permitted to execute the virtual machine,
wherein the first execution environment comprises a pre-boot environment comprising a Unix-like virtual machine and wherein the virtual machine comprises an operating system including encryption of portions of the operating system required for execution of the operating system other than a preboot portion thereof within the operating system and requiring password entry prior to decryption of the encrypted portions of the operating system, and wherein the first execution environment controls at least an aspect of the operating system during execution thereof to enter an unsecured password through a keyboard interface to the operating system to continue execution of the virtual machine.

9. A method according to claim 8 wherein the first execution environment accesses the cipher key via a key management system within a third other virtual machine.

10. A method according to claim 8 wherein the first execution environment verifies the initiator thereof by verifying a token stored therein to determine whether the token has expired.

11. A method according to claim 8 wherein the first execution environment verifies the initiator thereof by providing a token stored therein to a third other virtual machine for authentication and the first execution environment for, when authenticated, receiving the secret from the third other virtual machine.

12. A method comprising:
initiating a first execution environment within the cloud, the first execution environment comprising a key access protocol for accessing a cipher key and for storing said cipher key within the first execution environment and for executing an operating system stored in encrypted form;
accessing by the first execution environment the cipher key for deciphering the encrypted form of the operating system to allow the operating system to be executed within the first execution environment; and
executing the operating system,
wherein the key access protocol comprises a pre-boot environment comprising a Unix-like operating system in execution for accessing a cipher key and for storing said cipher key within the first execution environment and wherein the operating system comprises a first operating system including encryption of portions of the operating system required for execution of the operating system other than a preboot portion thereof within the operating system and requiring password entry prior to decryption of the encrypted portions of the operating system,
wherein the first execution environment controls at least an aspect of the operating system during execution thereof to enter an unsecured password through a keyboard interface to the operating system to continue execution of the virtual machine.

13. A method according to claim 12 wherein:
the Unix-like operating system stores the cipher key within a known memory location prior to initiating the first operating system including encryption of portions of the operating system required for execution of the operating system other than a preboot portion thereof within the operating system and requiring password entry prior to decryption of the encrypted portions of the operating system; and
the Unix-like operating system controlling at least an aspect of the first operating system one of before and during execution thereof to enter an unsecured password to the first operating system to support decryption of the first operating system and execution thereof within the first execution environment.

14. A method according to claim 12 wherein the first execution environment comprises a security protocol for authenticating execution of the operating system comprising:
providing a token stored within the first execution environment and having an expiry time to a third other virtual machine for authentication and for, when authenticated, receiving a secret in response to the authentication, the secret for use one of for accessing the cipher key and as the cipher key.

* * * * *